(12) United States Patent
Tsukagoshi et al.

(10) Patent No.: US 7,428,013 B2
(45) Date of Patent: Sep. 23, 2008

(54) ELECTRONIC CAMERA HAVING SOLID-STATE IMAGE PICKUP DEVICE

(75) Inventors: Takeshi Tsukagoshi, Tachikawa (JP); Tomohiko Murakami, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 573 days.

(21) Appl. No.: 10/965,146

(22) Filed: Oct. 14, 2004

(65) Prior Publication Data

US 2005/0083424 A1 Apr. 21, 2005

(30) Foreign Application Priority Data

Oct. 15, 2003 (JP) .............................. 2003-355195

(51) Int. Cl.
*H04N 9/64* (2006.01)
*H04N 5/222* (2006.01)

(52) U.S. Cl. .................................. 348/249; 348/333.01

(58) Field of Classification Search ................. 348/315, 348/317, 333, 222.01, 333.01, 248, 297, 348/362, 249, 213.19
See application file for complete search history.

(56) References Cited

U.S. PATENT DOCUMENTS 6,947,089 B1 * 9/2005 Hori ............................ 348/312

7,274,399 B2 * 9/2007 Oda et al. ..................... 348/315

FOREIGN PATENT DOCUMENTS

| JP | 02-166974 A | 6/1990 | |
|---|---|---|---|
| JP | 02-166976 A | 6/1990 | |
| JP | 10-13748 A | 1/1998 | |
| JP | 2001-069406 A | 6/2001 | |
| JP | 2003-143482 | * 5/2003 | ................... 5/335 |

OTHER PUBLICATIONS

Japanese Office Action (and English translation thereof) dated Mar. 4, 2008, issued in a counterpart Japanese Application.

* cited by examiner

*Primary Examiner*—Tu an V Ho
*Assistant Examiner*—Trung Diep
(74) *Attorney, Agent, or Firm*—Frishauf, Holtz, Goodman & Chick, P.C.

(57) ABSTRACT

PDs and vertical CCDs are formed on CCD. A control unit drives the CCD by one of a first image pickup mode for executing an exposure and reading the electric charges on the vertical CCDs and transferring those, and a second image pickup mode for setting an electric charge sweep-out period in which the electric charges are swept out by applying a plurality of vertical shift clocks to the vertical CCDs within a period from a time when a transfer period in which the electric charges obtained by exposing the PDs are read on the vertical CCDs and transferred those is terminated up to a time when a next transfer period is started.

18 Claims, 5 Drawing Sheets

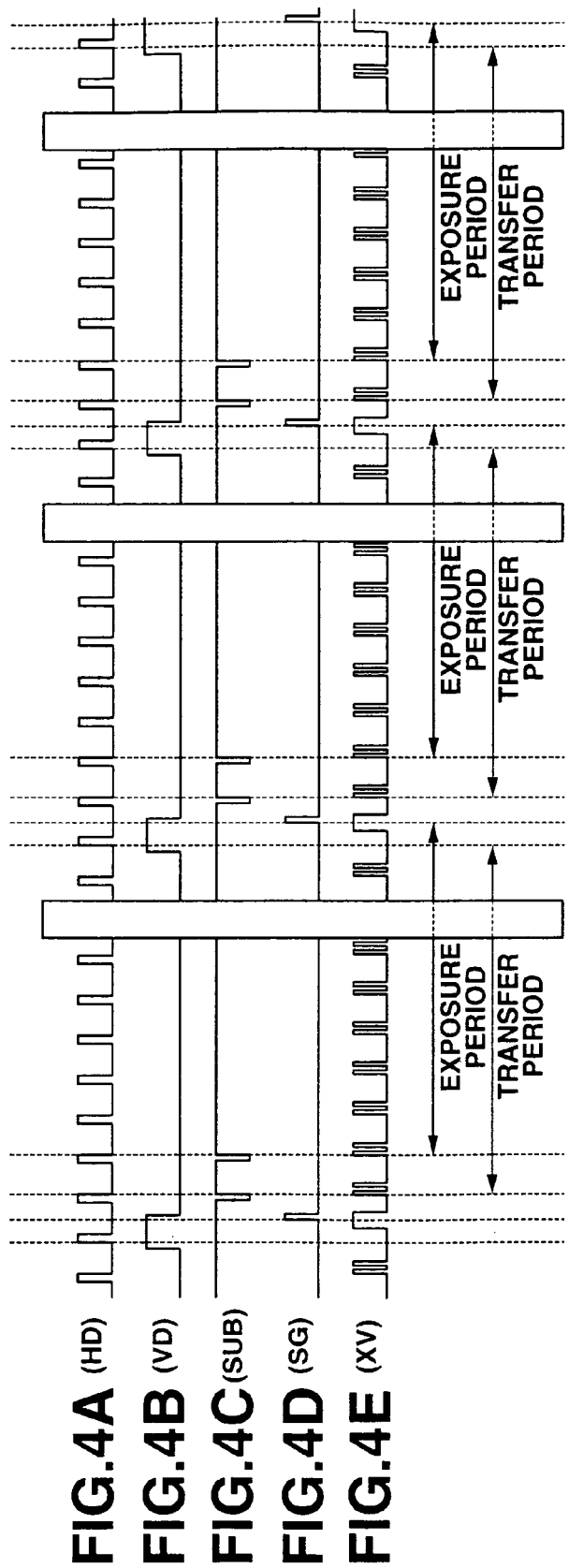

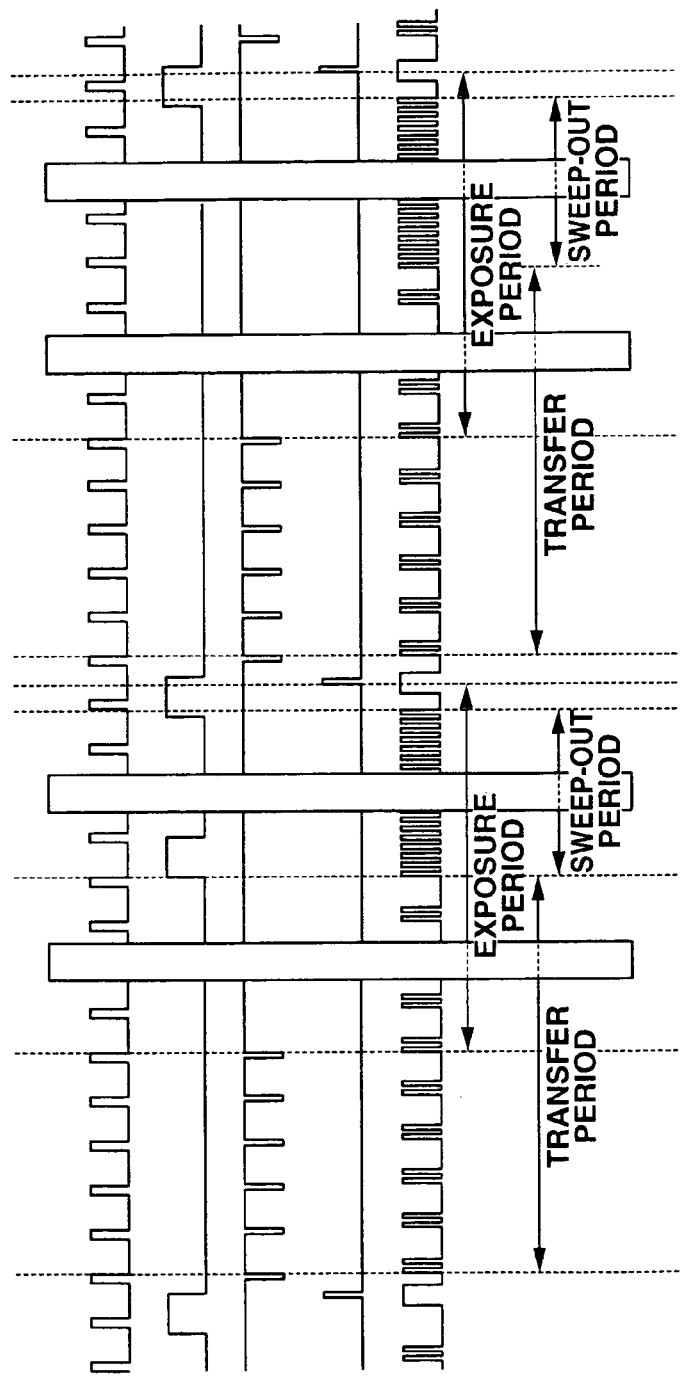

ELECTRONIC CAMERA HAVING SOLID-STATE IMAGE PICKUP DEVICE

CROSS-REFERENCE TO RELATED APPLICATIONS

This application is based upon and claims the benefit of priority from prior Japanese Patent Application No. 2003-355195, filed Oct. 15, 2003, the entire contents of which are incorporated herein by reference.

BACKGROUND OF THE INVENTION

1. Field of the Invention

The present invention relates to an electronic camera, a solid-state image pickup device, and a driving method for a solid-state image pickup device which can be used for, for example, a digital camera having a CCD.

2. Description of the Related Art

Conventionally, in CCDs (Charge Coupled Device) which have been most generally used as solid-state image pickup devices, at the time of photographing a strong light source, during a period of time when electric charge signals obtained by photoelectric conversion by PDs (photodiodes) provided in units of pixels are being read onto vertical CCDs which are transfer lines and are being sequentially transferred, electric charges are further superposed at the vertical CCDs which should be shielded. In addition thereto, the electric charges accumulated at the vertical CCDs are not entirely transferred and are remained, and as a result, there are cases in which a phenomenon called "smear" that a light stripe appears vertically in an obtained image is brought about.

In order to prevent smear, it is most effective to mechanically shield all over the light receiving surface of the CCD after an exposure timing by a mechanical shutter. However, at the time of moving picture mode in which image pickup of, for example, about ten frames through thirty frames per one second is successively carried out, the above-described mechanical shutter cannot be used.

Further, as another technique for preventing smear, it has been considered that, in an operating mode in which output signals of a CCD solid-state image pickup device are used for processings for various control systems, an electric charge sweeping-out pulse is applied to a substrate of the CCD at every period of all of horizontal blanking at least within a vertical synchronizing period after light receiving at a plurality of sensor units, and immediately before reading signal charges from the plurality of sensor units to vertical CCDs, the vertical CCDs are driven to transfer at a high speed in order to sweep out the electric charges in the vertical CCDs.

BRIEF SUMMARY OF THE INVENTION

According to an embodiment of the present invention, an electronic camera comprises a image pickup unit comprising light receiving elements arranged in a matrix form and transfer lines for transferring electric charges obtained by exposing the light receiving elements; a display unit which displays an image obtained by the image pickup unit; a recording unit which records the image obtained by the image pickup unit; a first driving unit which drives the image pickup unit by periodically executing exposure of the light receiving elements, and transfer of the electric charges by the transfer lines; a second driving unit which drives the image pickup unit by periodically executing exposure of the light receiving elements, and transfer of the electric charges by the transfer lines, and by sweeping out the electric charges by driving the transfer lines at a high speed within a period from an end of a transfer of the electric charges to a start of a next transfer; and a driving switching unit which switches driving of the image pickup unit by the first driving unit and driving of the image pickup unit by the second driving unit.

According to another embodiment of the present invention, an electronic camera comprises image pickup means comprising light receiving elements arranged in a matrix form and transfer lines for transferring electric charges obtained by exposing the light receiving elements; means for displaying an image obtained by the image pickup means; means for recording the image obtained by the image pickup means; first driving means for driving the image pickup means by periodically executing exposure of the light receiving elements, and transfer of the electric charges by the transfer lines; second driving means for driving the image pickup means by periodically executing exposure of the light receiving elements, and transfer of the electric charges by the transfer lines, and by sweeping out the electric charges by driving the transfer lines at a high speed within a period from an end of a transfer of the electric charges to a start of a next transfer; and means for switching driving of the image pickup means by the first driving means and driving of the image pickup means by the second driving means.

According to another embodiment of the present invention, an image pickup device comprises a image pickup unit comprising light receiving elements arranged in a matrix form and transfer lines for transferring electric charges obtained by exposing the light receiving elements; and a drive unit which drives the image pickup unit in one of a first driving mode and a second driving mode, wherein the first driving mode executes exposure of the light receiving elements, and transfer of the electric charges by the transfer lines and the second driving mode executes exposure of the light receiving elements, and transfer of the electric charges by the transfer lines, and sweep-out of the electric charges by driving the transfer lines at a high speed within a period from an end of a transfer of the electric charges to a start of a next transfer.

According to another embodiment of the present invention, a driving method for an image pickup device comprising light receiving elements arranged in a matrix form and transfer lines for transferring electric charges obtained by exposing the light receiving elements, the driving method comprises setting a first image pickup mode which executes exposure of the light receiving elements, and transfer of the electric charges by the transfer lines; indicating a start of recording moving pictures when the first image pickup mode is set; and setting a second image pickup mode which executes exposure of the light receiving elements, and transfer of the electric charges by the transfer lines, and sweep-out of the electric charges by driving the transfer lines at a high speed within a period from an end of a transfer of the electric charges to a start of a next transfer.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIGS. 4A, 4B, 4C, 4D, and 4E are timing charts showing a driving state of the CCD in a normal mode according to the embodiment; and FIGS. 5A, 5B, 5C, 5D, and 5E are timing charts showing a driving state of the CCD in a high picture quality mode according to the embodiment.

DETAILED DESCRIPTION OF THE INVENTION

An embodiment of an electronic camera, a solid-state image pickup device, and a driving method for a solid-state image pickup device according to the present invention will now be described with reference to the accompanying drawings. Hereinafter, an embodiment in a case in which the present invention is applied to a digital camera will be described.

Figure 1:
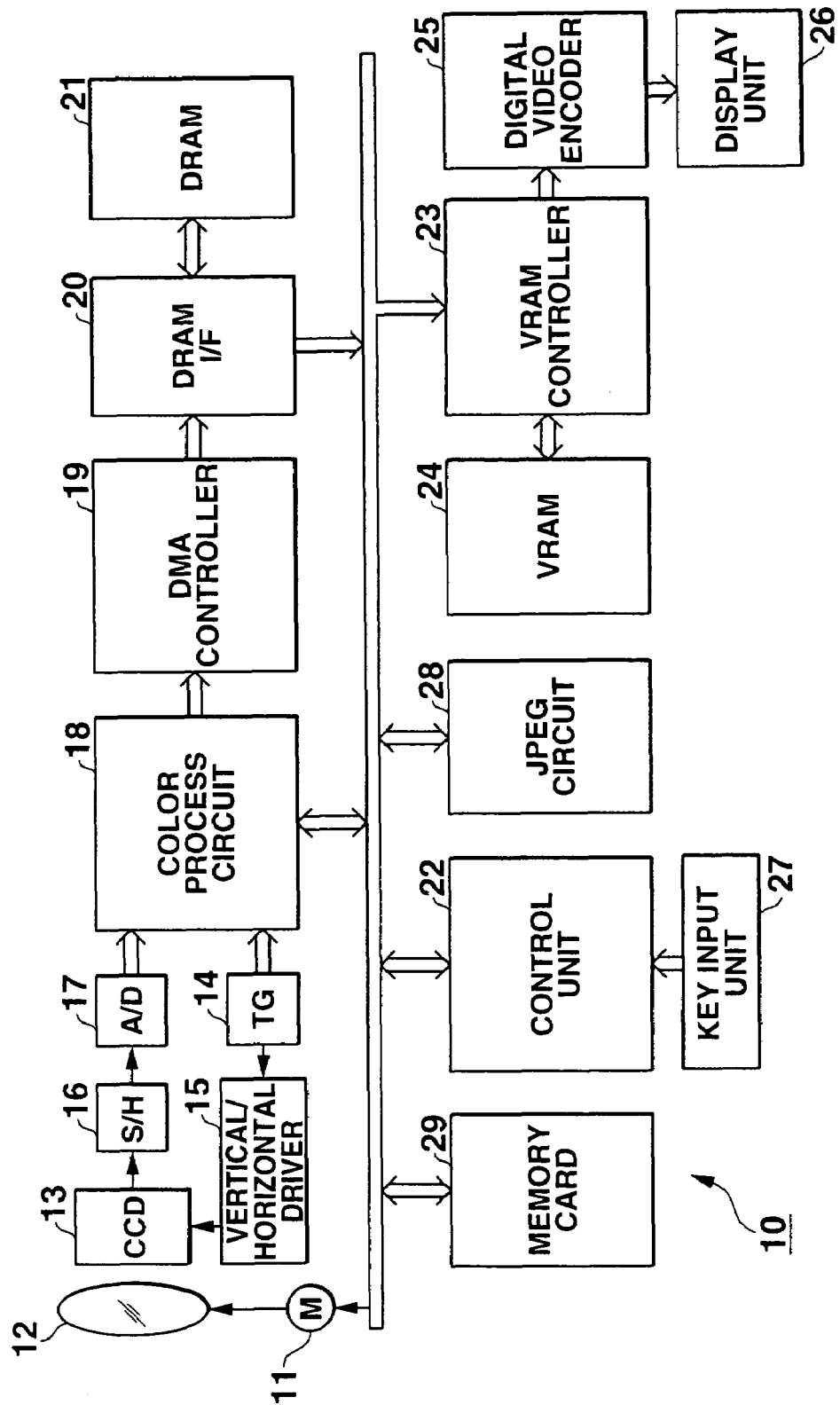
FIG. 1 is a block diagram showing a circuit configuration of a digital camera according to an embodiment of the present invention.

FIG. 1 shows a circuit configuration thereof, and reference numeral 10 is a digital camera.

The digital camera 10 can be set so as to switch a photographing mode and a playback mode as a basic mode. In a monitoring state in the photographing mode, a CCD 13 which is a solid-state image pickup device arranged in the rear and on the photographing optical axis of a lens optical system 12 whose focusing position and diaphragm position are moved by driving a motor (M) 11 is scanning-driven by a timing generator (TG) 14 and a vertical/horizontal driver 15, and outputs photoelectrically converted outputs of one frame which correspond to optical images formed at a constant period.

After the gains of the photoelectrically converted outputs are appropriately adjusted for each composition of the respective primary colors of R, G, and B in a state of being analog valued signals, the photo-electrically converted outputs are sampled-and-held at a sample-and-hold (S/H) circuit 16, and are converted into digital data in an A/D converter 17 and output to a color process circuit 18.

The color process circuit 18 carries out color process processing including pixel complement processing and gamma correction processing with respect to the digital data of the images transmitted from the A/D converter 17, and generates digital valued luminance signal Y and color-difference signals Cb, Cr, and outputs those to a DMA (Direct Memory Access) controller 19.

The DMA controller 19 once writes the luminance signal Y and the color-difference signals Cb, Cr output from the color process circuit 18 into a buffer at the inside of the DMA controller 19 by using a composite synchronizing signal, a memory write enable signal, and a clock signal from the color process circuit 18, and outputs those in a DMA transfer manner to a DRAM 21 used as a buffer memory via a DRAM interface (I/F) 20.

A control unit 22 is composed of a CPU, a ROM in which an operation program is stored, a RAM serving as a work memory, and the like in order to manage the operation control of the entire digital camera 10. After the DMA transfer of the luminance signal and the color-difference signals with respect to the DRAM 21 is completed, the control unit 22 reads the luminance and color-difference signals from the DRAM 21 via the DRAM interface 20, and writes those into a VRAM 24 via a VRAM controller 23.

A digital video encoder 25 periodically reads the luminance and color-difference signals from the VRAM 24 via the VRAM controller 23, and generates video signals on the basis of the data and outputs those to a display unit 26.

The display unit 26 is composed of, for example, a color liquid-crystal display panel with a back light and the driving circuit thereof, and is fixedly disposed at the back surface side of the body of the digital camera 10. The display unit 26 functions as a monitor display unit (electronic finder) in a photographing mode, and displays a through image based on the image information fetched from the VRAM controller 23 at that point in time by image picking-up at the CCD 13, by carrying out a display based on video signals from the digital video encoder 25.

In a state in which a through image at that point in time is being displayed in real-time on the display unit 26 in this way, when a shutter key among a plurality of keys configuring a key input unit 27 is operated in a timing when still picture photographing is required to be carried out, a trigger signal is generated.

After the DMA transfer of the luminance and color-difference signals of one frame which have been fetched from the CCD 13 at that point in time with respect to the DRAM 21 is completed in accordance with the trigger signal, the control unit 22 is converted to being in a state of recording and storing, temporarily stops driving of the CCD 13 at a constant period, obtains new image signals by driving the CCD 13 on the basis of the exposure conditions (a diaphragm and a shutter speed) which are appropriate at that point in time, and stores those in the DRAM 21.

The control unit 22 reads the image signals newly stored in the DRAM 21, i.e., the luminance and color-difference signals of one frame for each component of Y, Cb, Cr via the DRAM interface 20 in units called basic blocks structured from 8 pixels long×8 pixels wide, writes the image signals into a JPEG (Joint Photograph coding Experts Group) circuit 28, and compresses the data by processing such as ADCT (Adaptive Discrete Cosine Transform), Huffman coding which is an entropy coding method, or the like.

Then, the control unit 22 reads the obtained encoded data from the JPEG circuit 28 as a one frame data file, and writes the data into a memory card 29 which is mounted so as to be attachable and detachable as a recording medium of the digital camera 10, and in which a flash memory which is a nonvolatile memory is enclosed.

Then, upon completion of the compression processings of the luminance and color-difference signals of one frame and writing of all the compressed data into the memory card 29, the control unit 22 drives the CCD 13 at a constant period again so as to return to being in a monitoring state in which an image which is being photographed at that point in time is displayed on the display unit 26.

Further, at the time of photographing, not a still picture, but moving pictures, when the shutter key is operated for the first time, photographing and recording of a still picture described above are successively executed at a predetermined speed, for example, 15 frames per second. At a point in time when a predetermined time, for example, 30 seconds have passed or the shutter key has been operated for the second time, the photographing is interrupted, and the image data of a plurality of successive still pictures recorded on the memory card 29 are collectively set again as a moving picture file (AVI file) in accordance with the specifications of the motion JPEG.

Note that the above-described key input unit 27 is composed of, in addition to the shutter key described above, a mode switching key for switching a photo-graphing (REC) mode and a playback (PLAY) mode which are the basic modes, a photographing mode switching key for further switching a "still picture photographing mode" and a "moving picture photographing mode" in the photographing mode, a "menu" key for indicating various menu items, cross keys for instructing the respective directions of up/down/left/right in order to select images and various detailed modes and to designate menu selection items, a "set" key disposed at the central portion of the cross key, for instructing and setting the contents selected at that point in time, a display key for turning a display on the display unit 26 on and off, and the like. The signals accompanying those key operations are directly transmitted to the control unit 22.

Here, the basic configuration of the CCD 13 will be described with reference to FIG. 2.

Figure 2:
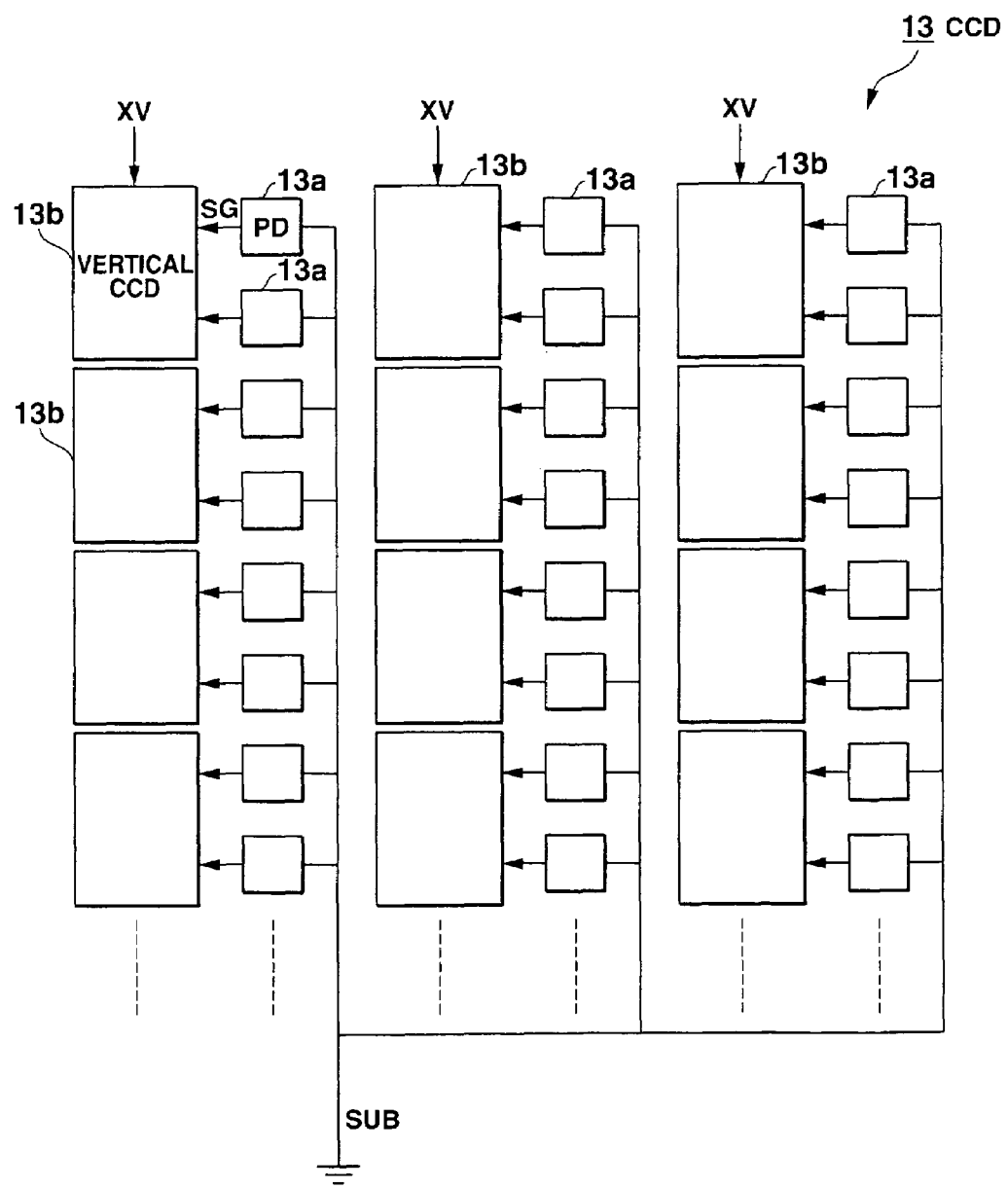
FIG. 2 is a diagram illustrating a configuration of some of PDs and vertical CCDs formed on a light-receiving surface of a CCD according to the embodiment.

FIG. 2 illustrates a part of the configuration of PDs (photodiodes) 13a, 13a, . . . which are arranged and formed in a matrix form on a light receiving surface of the CCD 13 and vertical CCDs 13b, 13b, . . . which will be transmission lines on which electric charge signals obtained by photoelectric conversion of the PDs 13a, 13a . . . are transmitted in the vertical direction for each column.

With respect to the respective PDs 13a, 13a, . . . , after accumulated electric charges are collectively discharged by a discharging signal SUB synchronized with a vertical synchronizing signal VD during initial phases of the frame, electric charges of the amount corresponding to the product of a quantity of light and a time are accumulated for each pixel by photoelectric conversion accompanying an exposure. The accumulated electric charges are read on the vertical CCDs 13b, 13b . . . which respectively correspond thereto at a same timing by a read-out signal SG.

The vertical CCDs 13b, 13b . . . are arranged such that two PDs 13a, 13a correspond to one vertical CCD 13b, and are respectively shielded, and sequentially shift the electric charges read from the PDs 13a, 13a . . . in the vertical direction in accordance with vertical shift clocks XV.

A horizontal CCD (not shown) is disposed at the end portion of the vertical CCDs 13b, 13b, . . . in a direction of shifting destination, the electric charges shifted at each vertical line are sequentially read in horizontal line units, and an amount of the electric charges is made to output to an amplifier circuit (not shown) at the following stage.

Next, operations of the above-described embodiment will be described.

Figure 3:
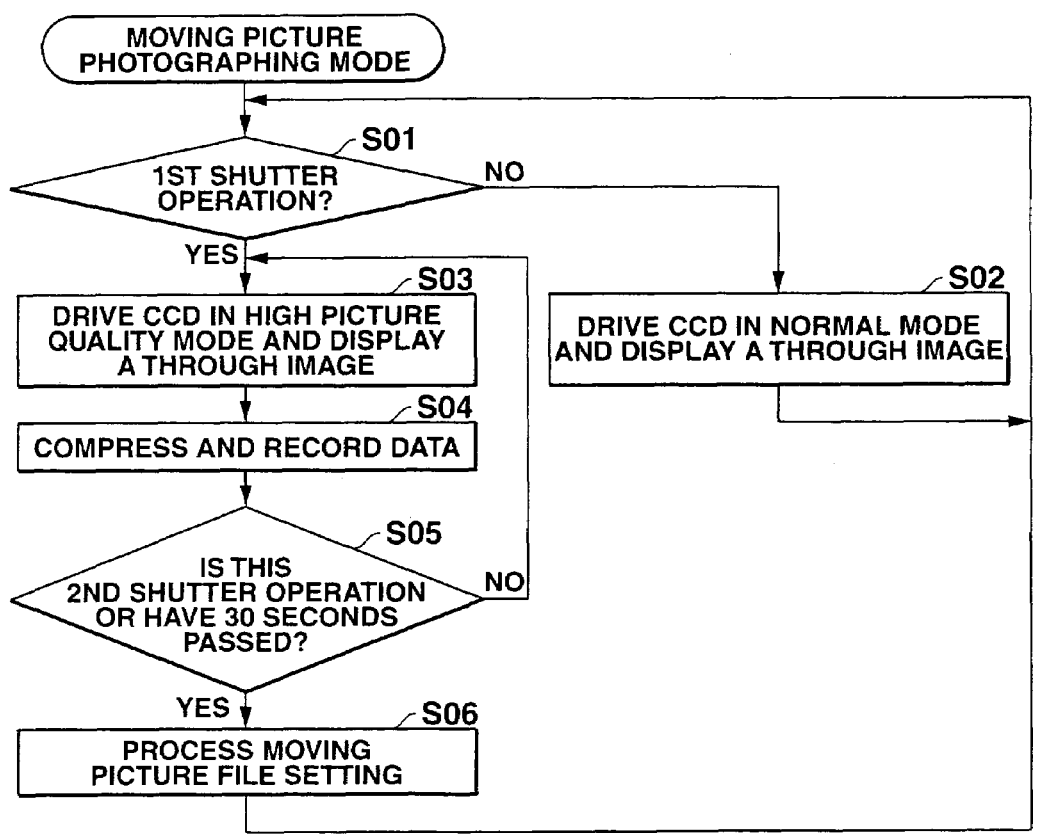
FIG. 3 is a flowchart showing processing contents in a moving picture photographing mode according to the embodiment.

FIG. 3 shows processing contents mainly based on an operation program executed by the control unit 22 in a state in which a photographing mode is selected as the basic mode and a moving picture photographing mode is selected.

During initial phases of the processing, first, it is determined whether or not a first shutter key operation is carried out (step S01). When the operation is not carried out, processing in which the CCD 13 is driven in a normal mode, and images to be picked up are successively stored as they are in the DRAM 21 which is a buffer memory, and are made to be in a state of displaying a through image which is monitor-displayed on the display unit 26 (step S02) is repeatedly executed. Then, it is waited for that a first operation of the shutter key is carried out from the state of displaying a through image.

Driving of the CCD 13 in a normal mode will be described with reference to FIGS. 4A to 4E.

FIG. 4A denotes a horizontal synchronizing signal HD showing the timings of transfer driving of a horizontal CCD (not shown) of the CCD 13, and FIG. 4B denotes a vertical synchronizing signal VD which will be a reference for frame synchronization of the images picked up at the CCD 13. An electric charge read-out signal SG shown in FIG. 4D is output so as to be synchronized with a fall in the vertical synchronizing signal VD, and both of an electric charge discharging signal SUB shown in FIG. 4C and a vertical shift clock XV shown in FIG. 4E are output so as to be synchronized with a fall in the horizontal synchronizing signal HD.

With respect to the vertical shift clock XV shown in FIG. 4E, in terms of the condition that one vertical CCD 13b is arranged so as to correspond to two PDs 13a, 13a, successive two pulses are input to one horizontal synchronizing signal HD.

After the electric charges are read from the PDs 13a, 13a, . . . to the vertical CCDs 13b, 13b, . . . by the electric charge read-out signal SG shown in FIG. 4D, due to the first vertical shift clock XV shown in FIG. 4E being input to the vertical CCDs 13b, 13b, . . . , a transfer, in the vertical direction, of the electric charges read on the vertical CCDs 13b, 13b, . . . is started.

On the other hand, after a fall in the above-described vertical synchronizing signal VD shown in FIG. 4B, the electric charge discharging signal SUB shown in FIG. 4C is input to the PDs 13a, 13a, . . . twice in succession so as to be synchronized with the horizontal synchronizing signal HD shown in FIG. 4A, and an exposure period is started immediately after the second discharging signal SUB is input for the second time and the electric charges are completely swept out from all the PDs 13a, 13a, . . . .

Then, the transfer period of the vertical CCDs 13b, 13b, . . . is completed at a timing when both of the vertical synchronizing signal VD shown in FIG. 4B and the horizontal synchronizing signal HD shown in FIG. 4A are made to be at "H" levels for the next time. Thereafter, when the electric charge read-out signal SG shown in FIG. 4D is input to the PDs 13a, 13a, . . . so as to be synchronized with the vertical synchronizing signal VD shown in FIG. 4B, the exposure period as well is completed, and the electric charges which have been accumulated in the PDs 13a, 13a, . . . up to that time are collectively read on the vertical CCDs 13b, 13b, . . . .

In this way, at the time of driving the CCD 13 in a normal mode, the processing is merely repeated simply in which the electric charges accumulated in the PDs 13a, 13a, . . . are read on the vertical CCDs 13b, 13b, . . . for an exposure period, and for a following transfer period, a vertical transfer is sequentially carried out as described above. At the vertical CCDs 13b, 13b . . . a vertical shift clock XV whose pulse width is slightly longer is merely input only one time during a period of time from the time when one transfer period is completed to the time when the next transfer period is started.

Therefore, in a case of photographing moving pictures under a strong light source, such as, in particular, a case of photographing a snow view or directly the sun, or the like, the electric charges are further superposed at the time of transferring the electric charges by the vertical CCDs 13b, 13b, . . . , and there are cases in which smear is brought about.

However, as long as the processing in the above-described steps S01 and S02 is repeated, because the image data to be obtained is merely displayed as a through image on the display unit 26 after being stored in the DRAM 21, and is not recorded onto the memory card 29, a serious bad effect will be not brought about later.

Then, when it is determined that the shutter key is operated for the first time in step S01, from that moment on, driving of the CCD 13 is switched from being in a normal mode to being in a high picture quality mode, and a display of a through image is carried out on the display unit 26 (step S03).

Driving of the CCD 13 in a high picture quality mode will be described with reference to FIGS. 5A, 5B, 5C, 5D, and 5E.

FIG. 5A denotes a horizontal synchronizing signal HD showing the timings of transfer driving of the horizontal CCD (not shown) of the CCD 13, and FIG. 5B denotes a vertical synchronizing signal VD which will be a reference for frame synchronization of images picked up at the CCD 13. An electric charge read-out signal SG shown in FIG. 5D is output so as to be synchronized with a fall in the vertical synchronizing signal VD shown in FIG. 5B, and both of an electric charge discharging signal SUB shown in FIG. 5C and a vertical shift clock XV shown in FIG. 5E are output so as to be synchronized with a fall in the horizontal synchronizing signal HD shown in FIG. 5A.

With respect to the vertical shift clock XV shown in FIG. 5E, in terms of the condition that one vertical CCD 13b is disposed so as to correspond to two PDs 13a, 13a, successive two pulses are input with respect to one horizontal synchronizing signal HD shown in FIG. 5A.

After the electric charges are read from the PDs 13a, 13a, . . . to the vertical CCDs 13b, 13b, . . . by the electric charge read-out signal SG shown in FIG. 5D, due to the first vertical shift clock XV shown in FIG. 5E being input to the vertical CCDs 13b, 13b, . . . , a transfer, in the vertical direction, of the electric charges read on vertical CCDs 13b, 13b, . . . is started.

On the other hand, after a fall in the vertical synchronizing signal VD shown in FIG. 5B, the electric charge discharging signal SUB shown in FIG. 5C is input to the PDs 13a, 13a, . . . , for example, six times in succession with being synchronized with the horizontal synchronizing signal HD shown in FIG. 5A, and an exposure period is started immediately after the discharging signal SUB for the sixth time is input and the electric charges are completely swept out from all the PDs 13a, 13a, . . . .

Thereafter, at a point in time when all the electric charges of one frame which have been read on the vertical CCDs 13b, 13b, . . . in accordance with the vertical shift clocks XV shown in FIG. 5E are transferred to the horizontal CCD (not shown), the transfer period of the vertical CCDs 13b, 13b, . . . is completed. At the same time of the termination of the transfer period, the vertical shift clocks XV are successively input to the vertical CCDs 13b, 13b . . . at least by several stages of the vertical CCDs 13b, 13b . . . as shown in FIG. 5E.

Due to the successive vertical shift clocks XV being input to the vertical CCDs 13b, 13b, . . . , even if smear has been brought about and the electric charges have remained on the vertical CCDs 13b, 13b, . . . after the termination of the above-described transfer period, the residual electric charges are exactly swept out to the outside of the vertical CCDs 13b, 13b, . . . , and are cleared away.

Thereafter, when the electric charge read-out signal SG shown in FIG. 5D is input to the PDs 13a, 13a, . . . with being synchronized with the vertical synchronizing signal VD shown in FIG. 5B, the exposure period as well is terminated, and the electric charges which have been accumulated in the PDs 13a, 13a, . . . up to that time are collectively read on the vertical CCDs 13b, 13b, . . . .

In this way, at the time of driving the CCD 13 in a high picture quality mode, the processing is repeated in which, as described above, the electric charges accumulated in the PDs 13a, 13a . . . during an exposure period are read on the vertical CCDs 13b, 13b . . . . After vertical transfer is sequentially carried out at the vertical CCDs 13b, 13b . . . during a following transfer period, a period for sweeping-out electric charges is set, and the residual electric charges on the vertical CCDs 13b, 13b . . . are exactly swept-out to the outside.

Therefore, in a case of photographing moving pictures under a strong light source, such as, in particular, a case of photographing a snow view or directly the sun, or the like, the electric charges are further superposed at the time of transferring the electric charges at the vertical CCDs 13b, 13b, . . . , and even if smear is brought about and residual electric charges are generated in the vertical CCDs 13b, 13b, . . . , the electric charges is read from the PDs 13a, 13a, . . . after the residual electric charges are swept away. Therefore, an effect by smear can be exactly avoided.

The image data obtained in a high picture quality mode in this way is displayed as a through image on the display unit 26 as shown in step S03, and then, the data is compressed at the JPEG circuit 28 and is recorded on the memory card 29 (step S04).

Thereafter, when it is determined that the shutter key on the display unit 26 is operated for the second time, or whether or not a given time, for example, 30 seconds have passed after moving picture photographing was started (step S05). When it is not both of those, the routine returns to the processings from step S03 on, and the moving picture photographing is continued.

Then, in step S05, at a point in time when it is determined that the shutter key is operated for the second time, or a given time, for example, 30 seconds have passed after moving picture photographing was started, the moving picture photographing is stopped, and the image data of the successive still pictures recorded on the memory card 29 up to that time are collectively set again as an AVI file in accordance with the specifications of the motion JPEG (step S06). Thereafter, the routine returns to the processings from step S01 on again in order to make preparations for the next moving picture photographing.

In this way, in a moving picture photographing stand-by state in which, even if smear is brought about, a through image display is merely carried out and photographed images are not recorded on the memory card 29, the CCD 13 is driven in a normal mode which avoids wasteful power consumption. In addition, since the driving mode is switched to a high picture quality mode in which smear is prevented from being brought about at the time of recording images on the memory card 29, high-quality moving picture recording can be achieved.

Additionally, as shown in FIG. 5E, because the vertical shift clocks XV having high frequencies more than at least by the number of stages of the vertical CCDs 13b, 13b, . . . ,is applied to the vertical CCDs 13b, 13b, . . . . The electric charges remained on the vertical transfer lines by a generation of smear are more exactly swept out to the outside of the vertical CCDs 13b, 13b, . . . , which can contribute to high-quality moving picture recording.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

In the above-described embodiment, the case in which a CCD is used as a solid-state image pickup device is described. However, the present invention is not limited thereto, and can be easily applied to a CMOS area sensor or another solid-state image pickup device which is formed of a three layer pixel sensor and which absorbs the respective colors by different depths, or an electronic camera using these solid-state image pickup devices.

The above-described embodiment has been described such that the moving picture data obtained in a moving picture photographing mode are recorded in accordance with the specifications of the motion JPEG. However, provided that an MPEG circuit in accordance with the MPEG (Moving Picture coding Experts Group) specifications is provided in addition to the JPEG circuit 28, and the moving picture data are recorded as an MPEG file on the memory card 29, a data compressibility can be further improved which allows much moving picture data to be recorded.

The above-described embodiment has been described such that a method of driving a CCD is switched from a normal mode to a high picture quality mode in response to a shutter key operation. However, it may be configured such that the above-described shutter key is made to be a shutter key which can be operated at two stages of a half-pressed state and a fully-pressed state, and the method of driving the CCD is switched from a normal mode to a high picture quality mode in response to the half-pressed state of the shutter key, and the processing for recording images is started in response to the fully-pressed state of the shutter key.

The above-described embodiment has been described such that the shutter key is operated twice in the timings of a start and a stop of recording moving pictures. However, it may be configured such that moving picture recording is continued during a period of time when the shutter key is continuously being pressed. Independently thereof, it may be configured such that, not a still picture photographing mode or a moving picture photographing mode is selectively set by a mode setting, but a shutter key for still picture photographing and a shutter key for moving picture photographing are separately provided, and a still picture or moving pictures are photographed and recorded so as to correspond to an operated shutter key.

What is claimed is:

1. An electronic camera comprising:
    an image pickup unit comprising light receiving elements arranged in a matrix form and transfer lines for transferring electric charges obtained by exposing the light receiving elements;
    a display unit which displays an image obtained by the image pickup unit;
    a recording unit which records the image obtained by the image pickup unit;
    a first driving unit which drives the image pickup unit by periodically executing the exposure of the light receiving elements and the transfer of the electric charges by the transfer lines;
    a second driving unit which drives the image pickup unit by periodically executing the exposure of the light receiving elements and the transfer of the electric charges by the transfer lines, as well as by sweeping out the electric charges by driving the transfer lines at a high speed within a period between an end of a transfer of the electric charges and a start of a next transfer;
    a first camera control unit which controls the display unit to display images periodically obtained by the image pickup unit driven by the first driving unit, and which controls the recording unit not to record said images;
    a second camera control unit which controls the display unit to display images periodically obtained by the image pickup unit driven by the second driving unit, and which controls the recording unit to record said images; and
    a driving switching unit which selects one of a camera control by the first camera control unit and a camera control by the second camera control unit.

2. An electronic camera according to claim 1, further comprising:
    a compressing unit which compresses the images periodically obtained by the image pickup unit which is driven by the second driving unit, and
    wherein the recording unit records the images compressed by the compressing unit.

3. An electronic camera according to claim 1, further comprising:
    a generating unit which generates a moving picture file from the images periodically obtained by the image pickup unit which is driven by the second driving unit, and
    wherein the recording unit records the moving picture file generated by the generating unit.

4. An electronic camera according to claim 1, wherein the recording unit is attachable to and detachable from a body of the electronic camera.

5. An electronic camera according to claim 1, wherein the driving switching unit selects between the camera control by the first camera control unit and the camera control by the second camera control unit in response to a predetermined key operation.

6. An electronic camera according to claim 1, further comprising:
    a start indicating unit which indicates a start of recording moving pictures, and
    wherein the driving switching unit switches from the camera control by the first camera control unit to the camera control by the second camera control unit when the start of recording moving pictures is indicated by the start indicating unit.

7. An electronic camera according to claim 6, further comprising: a recording control unit which starts processing of recording the images obtained by the image pickup unit into the recording unit when the start of recording moving pictures is indicated by the start indicating unit.

8. An electronic camera according to claim 6, wherein the start indicating unit indicates the start of recording moving pictures in response to a predetermined key operation.

9. An electronic camera according to claim 8, further comprising:
    a shutter button, and
    wherein the start indicating unit indicates the start of recording moving pictures in response to an operation of the shutter button.

10. An electronic camera according to claim 8, further comprising:
    an end indicating unit which indicates an end of recording moving pictures, and
    wherein the end indicating unit indicates the end of recording moving pictures in response to a same key operation the predetermined key operation.

11. An electronic camera according to claim 1, further comprising:
  an end indicating unit which indicates an end of recording moving pictures, and
  wherein the driving switching unit switches from the camera control by the second camera control unit to the camera control by the first camera control unit when the end of recording moving pictures is indicated by the end indicating unit.

12. An electronic camera according to claim 11, further comprising a recording control unit which terminates processing of recording the images obtained by the image pickup unit into the recording unit when the end of recording moving pictures is indicated by the end indicating unit.

13. An electronic camera according to claim 11, wherein the end indicating unit indicates the end of recording moving pictures in response to a predetermined key operation.

14. An electronic camera according to claim 11, further comprising:
  a start indicating unit which indicates a start of recording moving pictures, and
  wherein the end indicating unit indicates the end of recording moving pictures when a predetermined time has elapsed after the start of recording moving pictures is indicated by the start indicating unit.

15. An electronic camera according to claim 1, wherein the second driving unit sweeps out the electric charges by applying electric charge shift pulses a number of times corresponding to a transfer shifting length to the transfer lines.

16. An electronic camera comprising:
  image pickup means comprising light receiving elements arranged in a matrix form and transfer lines for transferring electric charges obtained by exposing the light receiving elements;
  means for displaying an image obtained by the image pickup means;
  means for recording the image obtained by the image pickup means;
  first driving means for driving the image pickup means by periodically executing the exposure of the light receiving elements and the transfer of the electric charges by the transfer lines;
  second driving means for driving the image pickup means by periodically executing the exposure of the light receiving elements and the transfer of the electric charges by the transfer lines, as well as by sweeping out the electric charges by driving the transfer lines at a high speed within a period between an end of a transfer of the electric charges and a start of a next transfer;
  first camera control means for controlling the displaying means to display images periodically obtained by the image pickup means driven by the first driving means, and for controlling the recording means not to record said images;
  second camera control means for controlling the displaying means to display images periodically obtained by the image pickup means driven by the second driving means, and for controlling the recording means to record said images; and
  means for selecting one of a camera control by the first camera control means and a camera control by the second camera control means.

17. An image pickup device comprising:
  an image pickup unit comprising light receiving elements arranged in a matrix form and transfer lines for transferring electric charges obtained by exposing the light receiving elements; and
  a drive unit which drives the image pickup unit in one of a first image pickup mode and a second image pickup mode,
  wherein in the first image pickup mode a moving image for a monitor display is picked up by periodically executing the exposure of the light receiving elements and the transfer of the electric charges by the transfer lines, and
  wherein in the second image pickup mode a moving image for recording is picked up by periodically executing the exposure of the light receiving elements, the transfer of the electric charges by the transfer lines, and sweep-out of the electric charges by driving the transfer lines at a high speed within a period between an end of a transfer of the electric charges and a start of a next transfer.

18. A driving method for an image pickup device comprising light receiving elements arranged in a matrix form and transfer lines for transferring electric charges obtained by exposing the light receiving elements, the driving method comprising:
  setting a first image pickup mode which picks up a moving image for a monitor display by periodically executing the exposure of the light receiving elements and the transfer of the electric charges by the transfer lines;
  indicating a start of recording moving pictures when the first image pickup mode is set; and
  setting a second image pickup mode which picks up a moving image for recording by periodically executing the exposure of the light receiving elements, the transfer of the electric charges by the transfer lines, and sweep-out of the electric charges by driving the transfer lines at a high speed within a period between an end of a transfer of the electric charges and a start of a next transfer.

* * * * *